March 18, 1969 — G. B. DAWSON — 3,433,348
MEANS FOR CONVEYING COAL IN MINES
Filed April 14, 1967 — Sheet 1 of 2
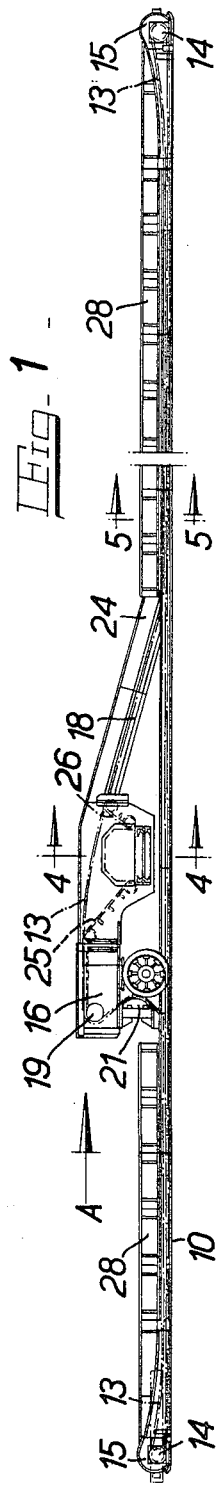
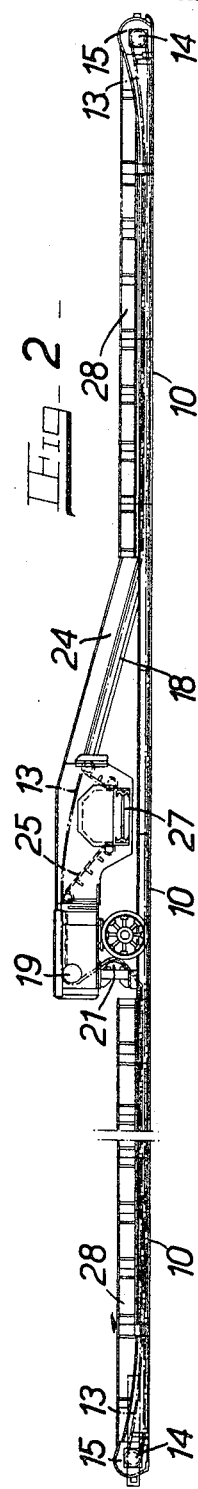
INVENTOR
Gordon B. Dawson
BY Kemon, Palmer, Stewart & Estabrook
ATTORNEYS

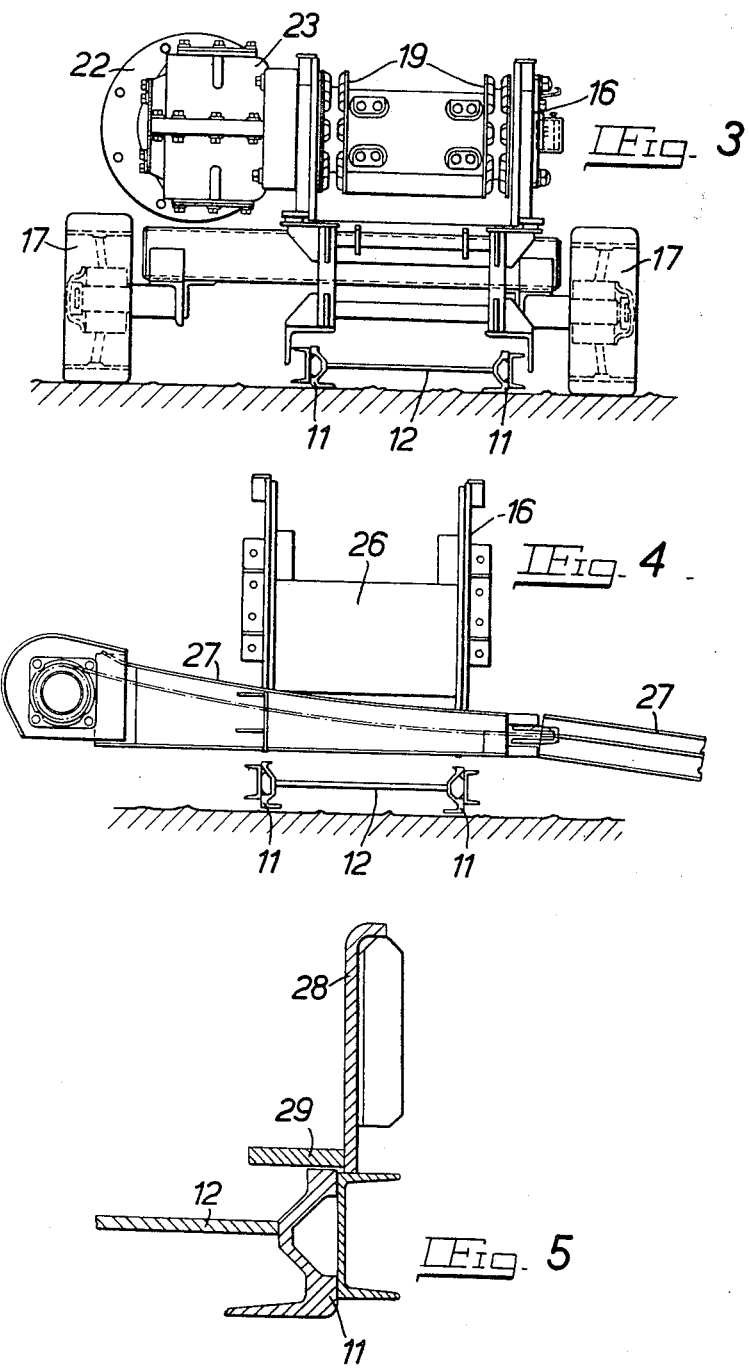

United States Patent Office 3,433,348
Patented Mar. 18, 1969

3,433,348
MEANS FOR CONVEYING COAL IN MINES
Gordon Bertram Dawson, 140 Northwick Road,
Worcester, England
Filed Apr. 14, 1967, Ser. No. 631,060
Claims priority, application Great Britain, Apr. 14, 1966,
16,323/66
U.S. Cl. 198—89     2 Claims
Int. Cl. B65g 37/00, 15/00, 17/00

ABSTRACT OF THE DISCLOSURE

In a conveying system for coal in mine workings in which a feeder conveyor or stage loader of the scraper chain type comprises a horizontal section and a ramp section by which coal carried on the conveyor is elevated for delivery, the horizontal section extends through and is longitudinally movable with respect to the ramp section and coal elevated by the ramp section is delivered under gravity to a transverse conveyor passing through the ramp section and over the horizontal section of the stage loader.

---

This invention relates to improvements in means for conveying coal in mines.

In our British Patent No. 743,662 we have described and claimed a feeder conveyor or stage loader of the scraper chain type having a substantially horizontal section of fixed length adapted to extend beneath a main conveyor which it feeds in line with it, and a ramp section in slidable connection with the horizontal section and forming with the latter a substantially continuous material transporting path for an endless scraper chain adapted to discharge on to the main conveyor.

The ramp section at its delivery end overlies the receiving end of the main conveyor which is fixed, and after a web of coal has been cut and removed a clamp between the horizontal and ramp section of the stage loader is released and the horizontal section is moved longitudinally while the ramp section remains where it was so that delivery on to the main conveyor continues normally.

According to our present invention, in a conveying system of that kind a coal carried up on the ramp section of the stage loader is delivered under gravity on to a transverse conveyor passing through the ramp section and over the horizontal part of the conveyor which extends longitudinally through and is longitudinally movable with respect to the ramp section.

Coal from a face conveyor or the like is delivered on to the horizontal part of the stage loader which is located on the coal face side of the ramp section, that section being clamped to the horizontal part. On releasing the clamping means the horizontal part of the conveyor can be moved longitudinally through the ramp section to follow up the face conveyor or a third conveyor from which it receives coal and of which the position varies relative to the stage loader.

The horizontal section of the stage loader is provided on each side with readily detachable spill plates having inwardly projecting flanges for trapping the chains in the upper run. When the horizontal section is moved longitudinally through the ramp section the spill plates are removed from behind or in front of the ramp section and inserted in front of or behind it.

One practical conveying system or stage loader in accordance with our invention is illustrated by way of example in the accompanying drawings in which:

FIGURE 1 is a side elevation showing the parts of the conveyor system in one extreme position;

FIGURE 2 is a similar side elevation showing the parts in the other extreme position;

FIGURE 3 is an end view of the driving unit viewed in the direction of the arrow A in FIGURE 1;

FIGURE 4 is a transverse section on the line 4—4 of FIGURE 1; and

FIGURE 5 is a fragmentary transverse section on a larger scale of the horizontal part of the conveyor taken on the line 5—5 of FIGURE 1.

In the conveyor system illustrated, 10 is a horizontal conveyor structure of fixed length built up in the usual way from aligned line pans of which the ends are interconnected by means providing for some degree of flexibility in both vertical and horizontal planes. Each line pan is of the form shown more particularly in FIGURES 3, 4 and 5 and comprises parallel side members 11 of Sigma section between which extends a horizontal deck-plate 12 of which the side edges are welded to the side members. The structure 10 rests on the floor of a road or gallery and is provided with skids (not shown) on which it can be moved longitudinally by hydraulic rams or pulling jacks.

The scraper bars are carried by endless chains 13, the conveying run travelling above the deck-plates 12 and the return run below them. At the ends of the structure 10 the chains are carried over return sprockets 14 in end units 15, one or both of the sprockets being adjustably mounted for chain tensioning.

At an intermediate point in its length the structure 10 extends under a combined driving and delivery unit 16 supported on wheels 17 from the floor of the road or gallery.

The upper run of the scraper chains coming from the right in FIGURES 1 and 2 is carried up an inclined ramp 18 leading upwardly from the structure 10 at the foot of the ramp to the unit 16. The chains are then carried over an elevated driving sprocket assembly 19 at the left hand end of the unit and down over a curved guide 21 and to the left as the upper chains of the horizontal structure 10 on the left side of the unit 16. The sprocket assembly 19 is driven by an electric motor 22 through a gearbox 23 housed in the unit 16 and seen in FIGURE 3.

The ramp 18 is provided at each side with spill plates 24 extending upwardly from a base which may be formed by the deck plates of line pans similar to those forming the structure 10. The base terminates at the upper end of the incline and coal brought up; the incline by the scraper bars of the conveyor is delivered into a hopper formed by oppositely inclined plates or walls 25, 26. The bottom of the hopper is open and the coal is discharged through it by gravity on to a transverse scraper conveyor 27 which extends through the lower part of the unit 16 and passes over the part of the horizontal structure 10 lying below the unit 16.

The parts of the structure 10 on each side of the unit 16 are provided with readily detachable spill plates 28 having inwardly projecting flanges 29, as shown in FIGURE 5, for trapping the chains on the upper run of the conveyor. The spill plates 29 adjacent to the lower end of the ramp 18 are preferably arranged to overlap the spill plates 24 at the foot of the ramp, and the trapping flanges are continued up on the ramp to hold the chains down at the change of gradient.

In FIGURES 1 and 2 the horizontal part of the conveyor on the right of the unit 16 and ramp 18 is the receiving section, and initially the structure 10 is clamped to the unit 16 by any convenient means with the structure located in such a position that the length of the structure on the left of the unit 16 is as short as practicable and there is a maximum length on the right. This is the position shown in FIGURE 1.

The horizontal section of the conveyor on the right receives coal from a face conveyor and conveys it along to the ramp 16 by which it is carried up and delivered on to the transverse conveyor 27.

As successive webs of coal are cut the face conveyor follows up the coal face and the point of delivery on to the horizontal section of the stage loader moves towards the unit 16. To accommodate this the clamping between the unit 16 and the structure 10 is released and the structure is pulled to the left through the unit 16, spill plates being removed from the structure on the right hand side of the unit and fitted to the structure on the left hand side on each move.

Ultimately the position shown in FIGURE 2 is reached, the minimum practicable length of the structure 10 remaining on the right or receiving end of the unit 16.

The unit 16, together with the ramp 18, is then moved to the left by a distance such that a minimum practical length of the structure 10 remains on the left hand side of the unit 15, that is, the relative positions of the unit 15 and the structure 10 are restored to those shown in FIGURE 1. As the unit 16 is moved to the left spill plates are removed from the structure 10 on the left of the unit and fitted to the structure on the right of the unit.

The unit 16 and the structure 10 are then clamped again and feeding of coal is restarted.

I claim:
1. A conveying system for conveying coal in mine working comprising:
  (a) a feeder conveyor or stage loader of the endless scraper chain type including
    (1) a horizontal section of fixed length and a ramp section, said horizontal section being movable through said ramp section, said sections providing a continuous path for the scraper chains, said ramp section being supported independently of said horizontal section;
    (2) an elevated sprocket assembly carried by said ramp section for the upper run of the scraper chains;
    (3) means carried by said ramp section for supplying motive power to said sprocket assembly for driving said scraper chains;
  (b) a transverse conveyor extending through said ramp section and positioned below the upper flight of said feeder conveyor;
  (c) and means for feeding material by gravity from said feeder conveyor to said transverse conveyor.

2. A conveying system as in claim 1 wherein the horizontal portions of the conveyor on opposite sides of the ramp section are fitted with readily detachable spill plates adapted to be transferred from the horizontal portion on one side of the ramp section to that on the other when the horizontal portion is moved through the ramp section.

References Cited
UNITED STATES PATENTS 3,314,525   4/1967   Krause _____ 198—36

FOREIGN PATENTS 959,986   3/1957   Germany.

RICHARD E. AEGERTER, *Primary Examiner.*

U.S. Cl. X.R.

198—129